(12) United States Patent
Horiguchi

(10) Patent No.: US 10,185,080 B2
(45) Date of Patent: Jan. 22, 2019

(54) LIGHTING DEVICE AND DISPLAY APPARATUS

(71) Applicant: Sakai Display Products Corporation, Sakai-shi, Osaka (JP)

(72) Inventor: Yuki Horiguchi, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/027,071

(22) PCT Filed: Sep. 24, 2014

(86) PCT No.: PCT/JP2014/075271
§ 371 (c)(1),
(2) Date: Apr. 4, 2016

(87) PCT Pub. No.: WO2015/053085
PCT Pub. Date: Apr. 16, 2015

(65) Prior Publication Data
US 2016/0231501 A1 Aug. 11, 2016

(30) Foreign Application Priority Data
Oct. 8, 2013 (JP) ................................. 2013-211219

(51) Int. Cl.
*F21V 8/00* (2006.01)
*G06F 1/16* (2006.01)
(Continued)

(52) U.S. Cl.
CPC ......... *G02B 6/0088* (2013.01); *G02B 6/0055* (2013.01); *G02B 6/0065* (2013.01);
(Continued)

(58) Field of Classification Search
CPC ................ G02B 6/0088; G02B 6/0093; G02F 2001/133317
See application file for complete search history.

(56) References Cited

U.S. PATENT DOCUMENTS 7,364,345 B2 * 4/2008 Fang .................... G02B 6/0088 362/288
7,575,360 B2 * 8/2009 Ohno ................... G02B 6/0091 362/23.01
(Continued)

FOREIGN PATENT DOCUMENTS

| JP | 2009032541 A | 2/2009 |
| JP | 2012-164507 A | 8/2012 |
| JP | 2012208254 A | 10/2012 |

*Primary Examiner* — William N Harris
(74) *Attorney, Agent, or Firm* — Rudy J. Ng; Bret E. Field; Bozicevic, Field & Francis LLP

(57) ABSTRACT

A lighting device, comprising a light guide plate being housed in a casing with an opening and having one surface facing the opening, and a light source placed to face a side surface of the light guide plate, and emitting, from the one surface of the light guide plate, light emitted from the light source and entering the light guide plate through the side surface, comprising a frame body covering an edge of the one surface of the light guide plate from a side of the one surface, wherein the frame body has a rib facing at least a part of a side surface of the light guide plate, except for a side surface at a side proximal to the light source, and extending toward a bottom surface of the casing, and the rib is configured to be capable of being bent by pressing force from the light guide plate.

7 Claims, 7 Drawing Sheets

(51) Int. Cl.
*G02F 1/1333* (2006.01)
*G09G 3/36* (2006.01)
*H04N 5/44* (2011.01)
*H04N 5/64* (2006.01)

(52) U.S. Cl.
CPC .......... *G02F 1/133308* (2013.01); *G06F 1/16* (2013.01); *G09G 3/36* (2013.01); *H04N 5/44* (2013.01); *G02F 2001/133317* (2013.01); *H04N 5/64* (2013.01)

(56) References Cited

U.S. PATENT DOCUMENTS

| | | | | |
|---|---|---|---|---|
| 2010/0149836 A1* | 6/2010 | Hung | .................... | G02B 6/0091 362/634 |
| 2011/0199784 A1* | 8/2011 | Isobe | .................... | G02B 6/0088 362/607 |
| 2012/0120326 A1* | 5/2012 | Takata | ................. | G02B 6/0061 348/790 |
| 2012/0170311 A1* | 7/2012 | Huang | ................. | G02B 6/0088 362/611 |
| 2013/0044277 A1* | 2/2013 | Momose | ............... | G02F 1/1336 349/62 |
| 2013/0308074 A1* | 11/2013 | Park | .................... | G02B 6/0088 349/58 |

* cited by examiner

LIGHTING DEVICE AND DISPLAY APPARATUS

CROSS-REFERENCE TO RELATED APPLICATIONS

This application is the national phase of PCT International Application No. PCT/JP2014/075271 which has an International filing date of Sep. 24, 2014 and designated the United States of America.

FIELD

The present invention relates to an edge light type lighting device and a display apparatus comprising the lighting device as a backlight.

BACKGROUND

In recent years, a display apparatus comprising a liquid crystal panel as an image display part is widespread. Such a display apparatus is so configured that a backlight (lighting device) is placed at the back side of the liquid crystal panel and the light emitted from the backlight is modulated by and transmitted through the liquid crystal panel to display an image on the front surface of the liquid crystal panel.

As a backlight, an edge light type backlight is known. The edge light type backlight comprises a light guide plate and a light source that are housed inside a box-shaped backlight chassis (casing) that has an opening at its one side. The light guide plate is mounted on the bottom plate of the backlight chassis, and the light source is fixed to a side plate of the backlight chassis to face a side surface of the light guide plate. The light source employs a light emitting diode (LED) or the like. This backlight is used in the state where the light guide plate is placed to face a back surface of the liquid crystal panel. In the backlight as described above, the light emitted from the light source enters the light guide plate through the side surface thereof and progresses inside the light guide plate while being diffused to be emitted from one surface of the light guide plate to illuminate the liquid crystal panel.

In the backlight having the configuration described above, heat generated during the light emission of the light source expands the light guide plate, which make contact with the light source, causing defect such as damage to the light source.

In the backlight device described in Japanese Patent Application Laid-open No 2012-164507, a support member for positioning the light guide plate is provided inside the casing, and a notch into which the support member is fitted is formed at the optimal position with respect to the light guide plate, such as at a light incident surface facing the light source of the light guide plate or the central part of the left or right side surface of the light guide plate, to control the movement of the thermally expanded light guide plate by fitting the support member into the notch. The extension of the light guide plate toward the light source is thereby restrained even when the light guide plate thermally expands, so that the contact between the light guide plate and the light source can be avoided.

SUMMARY

However, in the backlight device described in Patent Document 1, because the extension of the light guide plate toward the light source is restrained when the light guide plate thermally expands, the extension of the light guide plate along the direction other than toward the light source is made larger. To allow such extension, enough space is required between the side surface of the light guide plate and the side plate of the backlight chassis, which makes it difficult to achieve a narrow frame of a display apparatus comprising the backlight.

The present invention is made in consideration of the above-described circumstances, and the object thereof is to provide a lighting device suitable for the narrow frame and a display apparatus comprising the lighting device.

A lighting device according to one embodiment of the present invention, includes a light guide plate being housed in a casing with an opening and having one surface facing the opening, and a light source placed to face a side surface of the light guide plate, and emitting, from the one surface of the light guide plate, light emitted from the light source and entering the light guide plate through the side surface, including a frame body covering an edge of the one surface of the light guide plate from a side of the one surface, wherein the frame body has a rib facing at least a part of a side surface of the light guide plate, except for a side surface at a side proximal to the light source, and extending toward a bottom surface of the casing, and the rib is configured to be capable of being bent by pressing force from the light guide plate.

In the lighting device according to the embodiment of the present invention, the rib may extend along the side surface at a part of the frame body, except for a part at the side proximal to the light source.

In the lighting device according to the embodiment of the present invention, the rib may have a cut-out part, and the light guide plate may have a protrusion inserted through the cut-out part to protrude toward an outside of the rib.

In the lighting device according to the embodiment of the present invention, a plurality of said ribs may be arranged side by side with a distance between each other at a part of the frame body, except for a part at the side proximal to the light source, along the side surface.

In the lighting device according to the embodiment of the present invention, the frame body may have a rectangular frame shape, the light source may be placed at at least one of longer sides of the frame body, and the rib may be provided at each of both shorter sides of the frame body.

In the lighting device according to the embodiment of the present invention, the frame body may have a rectangular frame shape, the light source may be placed at one longer side of the frame body, and the rib may be provided at each of both shorter sides and the other longer side of the frame body.

A display apparatus according to one embodiment of the present invention, includes the lighting device described above, and a display panel placed to face the light guide plate of the lighting device, wherein light emitted from the light guide plate is directed to a back surface of the display panel to display an image at a front surface of the display panel.

According to the embodiment of the present invention, because the rib is bent to avoid preventing the extension of the light guide plate caused by thermal expansion thereof when the light guide plate makes contact with the rib due to the thermal expansion of the light guide plate, the side surface of the light guide plate can be arranged close to the rib to shorten the distance between the light guide plate and the side plate of the backlight chassis so as to make the lighting device suitable for the narrow frame of the display apparatus. In addition, the light guide plate is free from distortion even when making contact with the rib. Therefore, the lighting device can prevent the distortion of the light guide plate caused by the thermal expansion of the light guide plate. Consequently, the display apparatus comprising the lighting device described above can prevent the deterioration of display quality caused by the distortion of the light guide plate.

The above and further objects and features of the invention will more fully be apparent from the following detailed description with accompanying drawings.

DESCRIPTION OF EMBODIMENTS

The present invention will be described in detail below with reference to the drawings illustrating the embodiments thereof.

Embodiment 1

Figure 1:
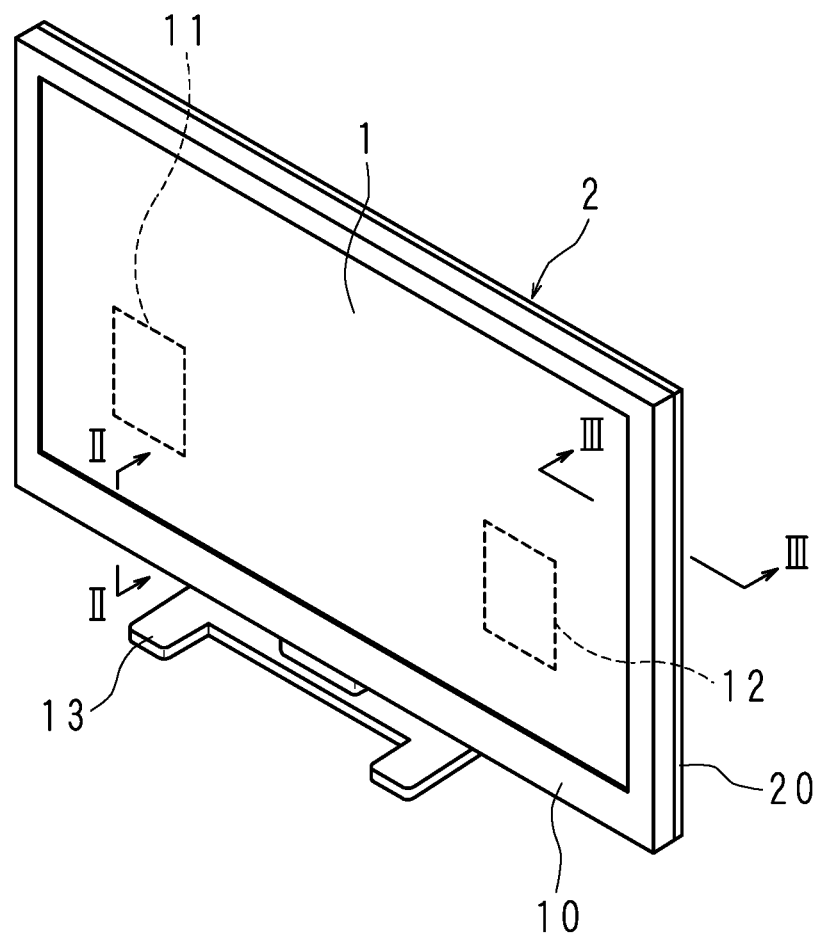
FIG. 1 is a perspective view schematically illustrating the exterior of a display apparatus according to Embodiment 1.
Figure 2:
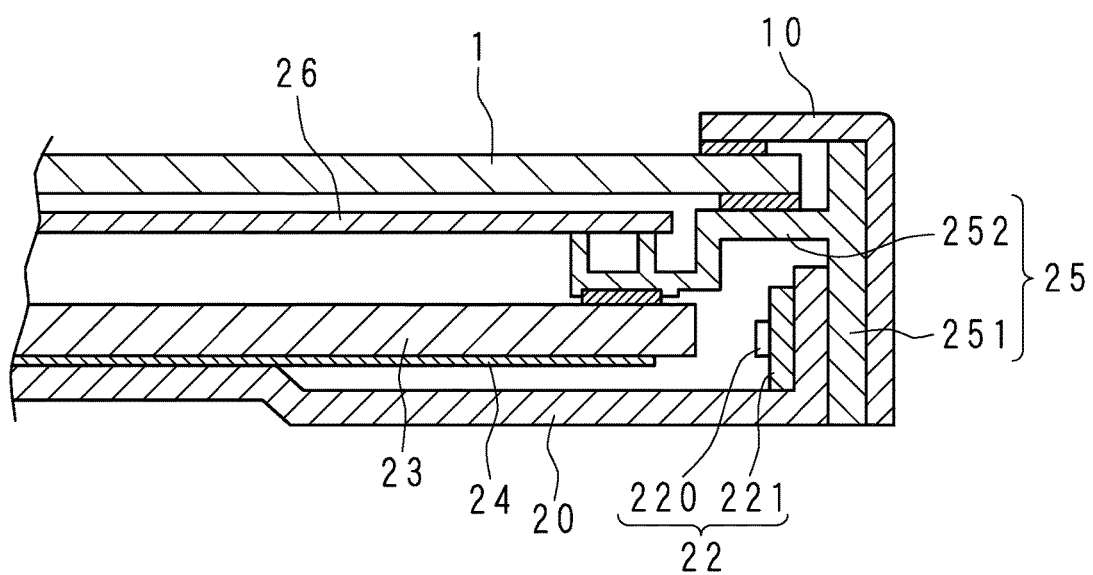
FIG. 2 is a vertical cross-sectional view along the line II-II in FIG. 1.

FIG. 1 is a perspective view schematically illustrating the exterior of a display apparatus according to Embodiment 1, and FIG. 2 is a vertical cross-sectional view along the line II-II in FIG. 1. The illustrated display apparatus comprises a liquid crystal panel (display panel) 1 with a rectangular plate shape used for displaying an image and a backlight (lighting device) 2 for irradiating the liquid crystal panel 1 with light.

The front cabinet 10 with a rectangular frame shape is assembled onto the liquid crystal panel 1 to frame the edges of the front surface (image displaying surface) of the liquid crystal panel 1 for an appropriate width. FIG. 1 illustrates only the image displaying surface of the liquid crystal panel 1 which is exposed inside the frame of the front cabinet 10. The back side of the liquid crystal panel 1 is covered by a backlight chassis (casing) 20 that has a substantially rectangular box shape and is a component of the outer casing of the backlight 2. The backlight chassis 20 is assembled onto the back side of the liquid crystal panel 1 as described below.

The display apparatus illustrated in FIG. 1 is configured as a television receiver that comprises a receiver 11 and a signal processor 12 both of which are assembled onto the back surface of the backlight chassis 20. The receiver 11 is connected to an antenna (not depicted) to receive a television broadcast via the antenna. The signal processor 12 decodes the data according to the television broadcast received by the receiver 11 and separates image data from the decoded data to output the separated image data. The liquid crystal panel 1 displays an image based on the image data output by the signal processor 12 on the image displaying surface.

The display apparatus further comprises a stand 13. The stand 13 has a foot part that is formed to spread in an H shape substantially perpendicular to a leg protruding from the middle of one longer side of the backlight chassis 20 and connected to the tip of the leg. The display apparatus is supported by the stand 13 on the placement surface to be used while keeping the image displaying surface of the liquid crystal panel 1 in a vertical position. In the following description, one side of the image displaying surface of the liquid crystal panel 1 is referred to as the front and the other side is referred to as the rear. In addition, the upper and the lower used in the following description correspond to the upper and the lower directions in the state where display device is used as described above, respectively. Likewise, the left and the right correspond to the left and the right seen from the front side while in use.

The backlight 2 is placed at the back side of the liquid crystal panel 1. The backlight 2 comprises the backlight chassis 20, a light source part 22, a light guide plate 23, a reflection sheet 24 and a frame body 25. The backlight chassis 20 has a shallow box shape with one entire side thereof opened and houses the light source part 22, the light guide plate 23 and so forth.

The light guide plate 23 is made of synthetic resin, such as acrylic resin or polycarbonate resin, with high transparency and is formed in a rectangular plate shape. The light guide plate 23 is mounted on the bottom surface of the backlight chassis 20 in the state where the light emitting surface (one surface) of the light guide plate 23 faces the opening of the backlight chassis 20.

The reflection sheet 24 is a sheet made of synthetic resin with high reflectivity. The reflection sheet 24 is adhered to the surface opposite to the light emitting surface (other surface) of the light guide plate 23.

The light source plate 22 has a substrate 221 with a strip shape and a light source 220 mounted on the substrate 221. The light source 220 is, for example, a plurality of light emitting diodes, which are arranged side by side along the longitudinal direction of the substrate 221. The light source part 22 is fixed to a side plate of the backlight chassis 20 to orient the light source 220 toward the lower side surface of the light guide plate 23. It should be noted that the light source part 22 may be a cold cathode fluorescent lamp (CCFL), an external electrode fluorescent lamp (EEFL), a hot cathode fluorescent lamp (HCFL), etc.

Figure 7:
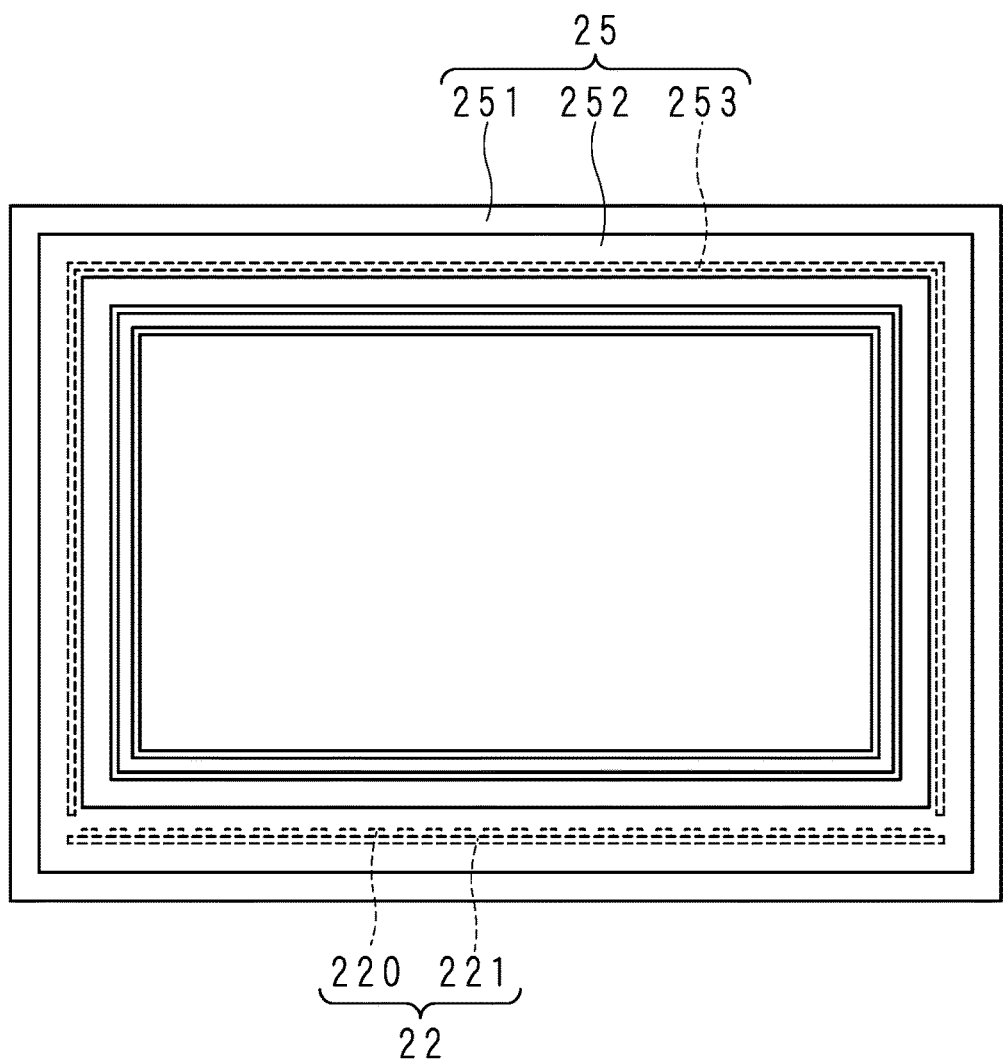
FIG. 7 is a front view illustrating the positional relationship between a frame body and a light source according to Embodiment 1.

As illustrated in FIG. 7, the frame body 25 is a rectangular member made of resin and covers the edges of the light emitting surface of the light guide plate 23 at the side of the light emitting surface. The frame body 25 has a surrounding plate 251 fitted to the side walls of the backlight chassis 20 from the outside and a pressing plate 252 extended perpendicularly from the inner surface of the surrounding plate 251. The pressing plate 252 abuts on the edge of the light emitting surface of the light guide plate 23 through a cushion to hold the light guide plate 23 between the pressing plate 252 and the bottom surface of the backlight chassis 20.

In the backlight 2 configured as described above, the light emitted from the light source 220 enters the light guide plate 23 through the side surface thereof and progresses inside the light guide plate 23, while undergoing repeated total reflections on the reflection sheet 24 and partial reflections on the light emitting surface, to be emitted from the whole of the light emitting surface.

In addition, the pressing plate 252 of the frame body 25 has an additional function of a support part for an optical sheet 26. The optical sheet 26 is held apart from the light emitting surface of the light guide plate 23 with an appropriate distance by support from the frame body 25. The optical sheet 26 is fabricated by laminating, for example, a diffusion sheet, a prism sheet and a polarizing sheet.

The liquid crystal panel 1 is mounted on the frame body 25 with the back surface thereof facing the optical sheet 26. The front cabinet 10 covers the edges of the front surface of the liquid crystal panel 1 and is fitted to the surrounding plate 251 of the frame body 25 from the outside. The display apparatus is configured as described above. In the display apparatus as described above, when the light source 220 is turned on, the light that has been emitted from the light source 220 and has entered the light guide plate 23 through the lower side surface thereof is emitted from the light emitting surface of the light guide plate 23 to illuminate the back surface of the liquid crystal panel 1.

Figure 3:
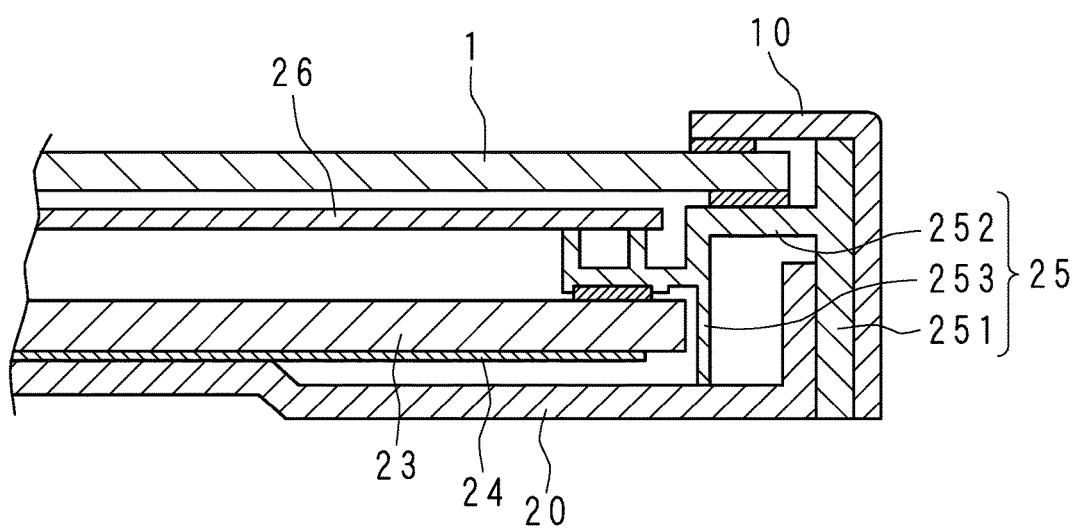
FIG. 3 is a vertical cross-sectional view along the line III-III in FIG. 1.

FIG. 3 is a vertical cross-sectional view along the line III-III in FIG. 1. FIG. 3 illustrates the cross section where the light source is not placed. At that position, the frame body 25 further has a rib 253 facing the side surface of the light guide plate 23 and extending toward the bottom of the backlight chassis 20. The rib 253 is provided to expand along the length direction of each side of the frame body 25, except for the side proximal to the light source, along each side surface of the light guide plate 23. As illustrated in FIG. 3, the thickness of the rib 253 along the inside-outside direction is made thinner than that of other parts of the frame body 25. The rib 253 is thus bendable when pressure is applied in the thickness direction.

Figure 4:
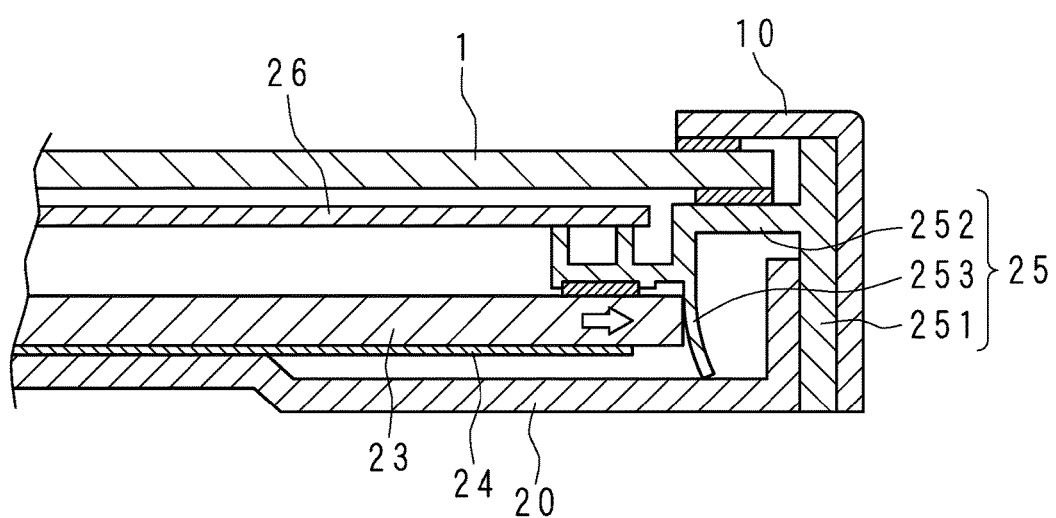
FIG. 4 is an explanatory drawing for explaining the way a rib functions when a light guide plate thermally expands.

In the backlight 2, when the light source 220 is turned on, heat is generated by the light emission of the light source 220 and is conducted to the light guide plate 23. Therefore, the light guide plate 23 thermally expands due to the heat generated by the light emission of the light source 220. FIG. 4 is an explanatory drawing for explaining the way the rib 253 functions when the light guide plate 23 thermally expands. As illustrated in FIG. 4, when the light guide plate 23 thermally expands due to the heat generated by the light emission of the light source 220, the light guide plate 23 extends toward right to make contact with the rib 253 and then pushes the rib 253 toward right, as represented by the void arrow in FIG. 4. The pressed rib 253 bends toward right.

While only the right side of the backlight 2 is illustrated and described above, similar structures are provided at the left and upper sides of the backlight 2.

As described above, when the light guide plate 23 housed in the backlight chassis 20 makes contact with the rib 253 due to the thermal expansion of the light guide plate 23, the extension of the light guide plate 23 caused by the thermal expansion is not prevented because the rib 253 is bendable. Therefore, the side surface of the light guide plate 23 can be placed close to the rib 253 to shorten the distance between the side surface of the light guide plate 23 and the side plate of the backlight chassis 20. Accordingly, in the display apparatus comprising the backlight 2 described above, the front cabinet 10 framing the liquid crystal panel 1 can be made slimmer. Additionally, in the display apparatus comprising the backlight 2, because the light guide plate 23 of the backlight 2 is free from distortion when in contact with the rib 253, the deterioration of display quality caused by the distortion of the light guide plate 23 can be prevented.

Embodiment 2

Figure 5:
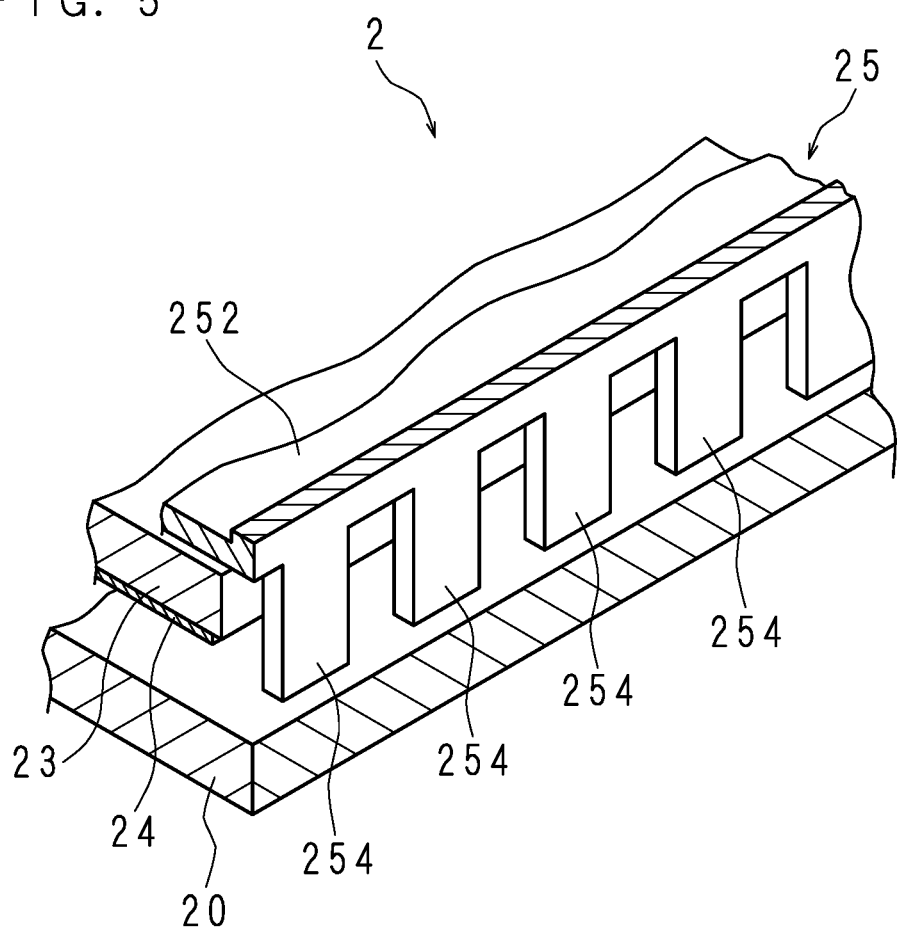
FIG. 5 is a perspective cross-sectional view illustrating main components of a backlight according to Embodiment 2.

FIG. 5 is a perspective cross-sectional view illustrating main components of a backlight 2 according to Embodiment 2. The components and functions except for ones described specifically below are similar to those in Embodiment 1, and thus the description thereof will not be repeated for simplicity.

As illustrated in FIG. 5, a plurality of rectangular ribs 254, 254, . . . are provided at the frame body 25 of the backlight 2. The ribs 254, 254, . . . are arranged side by side, separated from each other in the length direction, at three sides of the frame body 25, except for the side proximal to the light source 220, along the side surfaces of the light guide plate, forming a shape of comb teeth. When the light guide plate 23 makes contact with the ribs 254, 254, . . . due to the thermal expansion thereof, the ribs 254, 254, . . . bend to allow the thermal expansion of the light guide plate 23, similarly to Embodiment 1. The ribs 254, 254, . . . have small resilience against the pressing force from the light guide plate 23 and thus can bend easily. Therefore, they can surely accommodate the amount of the extension of the light guide plate 23 caused by the thermal expansion.

Embodiment 3

Figure 6:
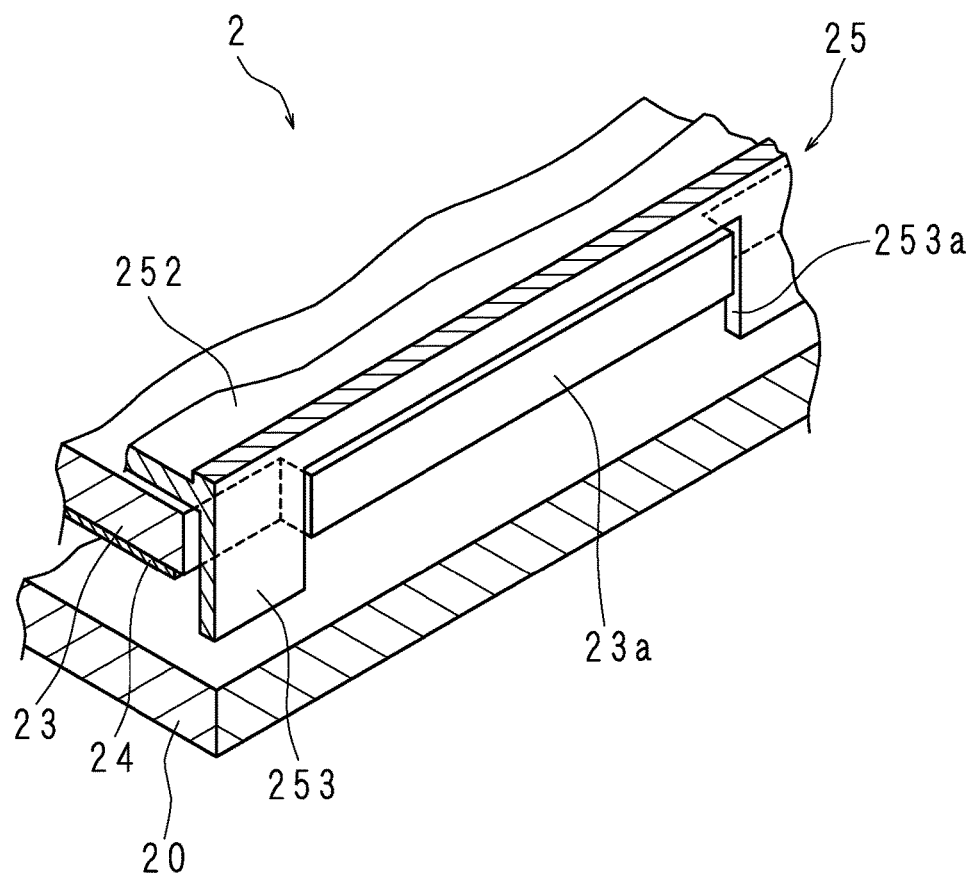
FIG. 6 is a perspective cross-sectional view illustrating main components of a backlight according to Embodiment 3.

FIG. 6 is a perspective cross-sectional view illustrating main components of a backlight 2 according to Embodiment 3. The components and functions except for ones described specifically below are similar to those in Embodiment 1 and 2, and thus the description thereof will not be repeated for simplicity.

As illustrated in FIG. 6, a cut-out part 253a that has a rectangular cross section is formed at a part of the rib 253. The light guide plate 23 has a protrusion 23a that has a rectangular cross section and is protrudingly formed from the right side surface of the light guide plate 23. The protrusion 23a is inserted through the cut-out part 253a.

As described above, in the present embodiment, the protrusion 23a is inserted through the cut-out part 253a so as to allow the light guide plate 23 to expand its external dimensions as well as to be surely positioned. The display apparatus comprising the backlight 2 described above can enhance the display quality.

While, in the above embodiments, the configuration is described in which the ribs 253, 254 are provided on the three sides of the frame body 25 except for the side proximal to the light source 220, the rib 253 may be provided only at both shorter sides of the frame body 25. Because the shape of the light guide plate 23 is a rectangle that is longer in the right-left direction, the thermal expansion in the right-left direction is larger and the thermal expansion in the upper-lower direction is smaller. Therefore, the rib 253 may be excluded in the upper side of the frame body 25 in each embodiment above.

In addition, while in the above embodiments the configuration is described in which one light source part 22 is provided, two light source parts 22 may also be provided. In such a case, the two light source parts 22 may be provided to face the right and left sides of the light guide plate 23 respectively, or to face the upper and lower sides of the light guide plate 23 respectively, for example.

Furthermore, while in the above embodiments the configuration is described in which the optical sheet 26 is held apart with a distance from the light emitting surface of the light guide plate 23, the optical sheet 26 may be adhered to the light emitting surface of the light guide plate 23. When the optical sheet 26 is adhered to the light emitting surface of the light guide plate 23, the frame body 25 covers the edges of the optical sheet 26 and the light guide plate 23 from a side of the optical sheet 26 while holding the optical sheet 26 and the light guide plate 23 between the bottom surface of the backlight chassis 20 and the frame body 25.

It should be understood that the embodiments disclosed herein are illustrative and non-restrictive in every respect. Since the scope of the present invention is defined by the appended claims rather than by the description preceding them, and all changes that fall within metes and bounds of the claims, or equivalence of such metes and bounds thereof are therefore intended to be embraced by the claims.

It is noted that, as used herein and in the appended claims, the singular forms "a", "an", and "the" include plural referents unless the context clearly dictates otherwise.

The invention claimed is:

1. A lighting device, comprising a light guide plate being housed in a casing with an opening and having a front surface facing the opening, and a light source placed to face a side surface of the light guide plate, and emitting, from the front surface of the light guide plate, light emitted from the light source and entering the light guide plate through the side surface, comprising
   a frame body covering an edge of the front surface of the light guide plate from a side of the front surface, wherein
   the frame body is a rectangular frame-shaped member made of resin,
   the frame body comprises:
      a surrounding plate fitted to side walls of the casing from an outside,
      a pressing plate extended perpendicularly from an inner surface of the surrounding plate, and
      a rib facing at least a part of a side surface of the light guide plate, except for a side surface of the light guide plate at a side proximal to the light source, and extending from the pressing plate toward a bottom surface of the casing,
   wherein
   the lighting device further comprises an optical sheet held apart at a distance from the front surface of the light guide plate by support from the pressing plate, the pressing plate is located between the optical sheet and the light guide plate, and abuts on the edge of the front surface of the light guide plate through a cushion to hold the light guide plate between the cushion and the bottom surface of the casing, and
   the rib is thinner than other parts of the frame body and configured to be capable of being bent by pressing force from the light guide plate.

2. The lighting device according to claim 1, wherein the rib extends along the side surface at a part of the frame body, except for a part at the side proximal to the light source.

3. The lighting device according to claim 2, wherein
   the rib has a cut-out part, and
   the light guide plate has a protrusion inserted through the cut-out part to protrude toward an outside of the rib.

4. The lighting device according to claim 1, wherein a plurality of said ribs are arranged side by side with a distance between each other at a part of the frame body, except for a part at the side proximal to the light source, along the side surface.

5. The lighting device according to claim 1, wherein
   the light source is placed at at least one of longer sides of the frame body, and
   the rib is provided at each of both shorter sides of the frame body.

6. The lighting device according to claim 1, wherein
   the light source is placed at one longer side of the frame body, and
   the rib is provided at each of both shorter sides and the other longer side of the frame body.

7. A display apparatus, comprising:
   the lighting device according to claim 1, and
   a display panel placed to face the light guide plate of the lighting device,
   wherein light emitted from the light guide plate is directed to a back surface of the display panel to display an image at a front surface of the display panel.

* * * * *